Jan. 16, 1940.  R. R. SMITH  2,187,576
VIBRATORY ELECTROMAGNETIC MOTOR
Filed June 6, 1935  2 Sheets-Sheet 1
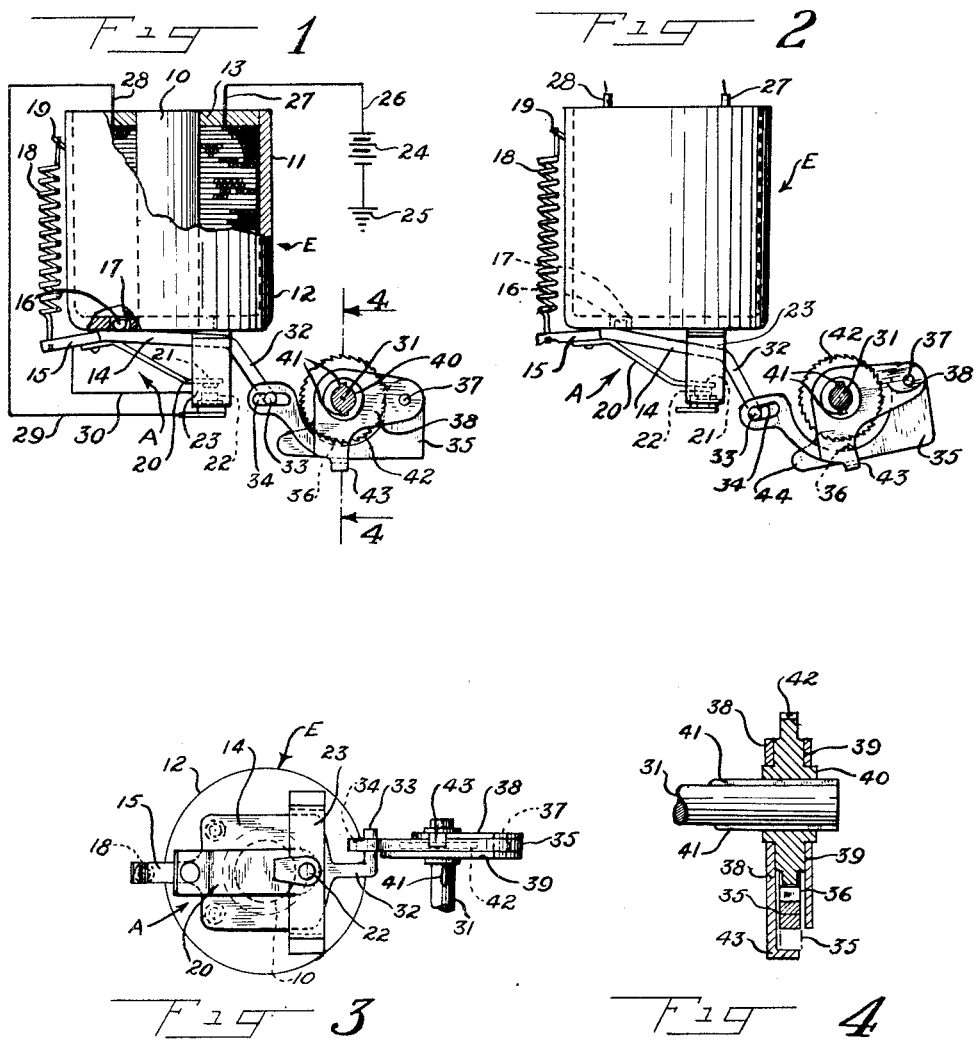
INVENTOR.
RALPH R. SMITH
BY Charles C. Scheffler
ATTORNEY.

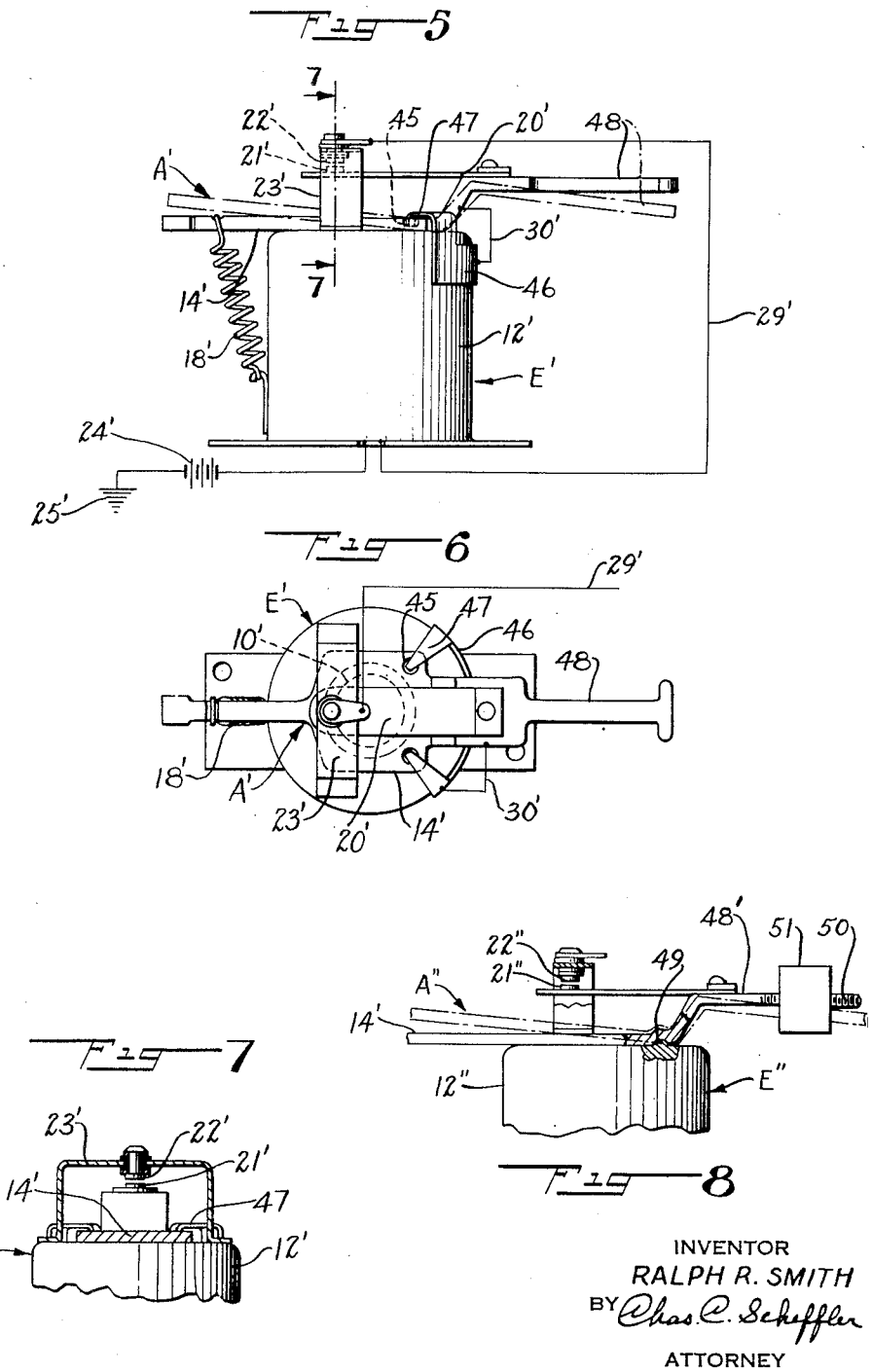

Patented Jan. 16, 1940

2,187,576

UNITED STATES PATENT OFFICE 2,187,576

VIBRATORY ELECTROMAGNETIC MOTOR

Ralph R. Smith, Cleveland, Ohio, assignor, by mesne assignments, to Union Carbide and Carbon Corporation, a corporation of New York Application June 6, 1935, Serial No. 25,242

21 Claims. (Cl. 172—126)

This invention relates to electromagnetic motors having a vibratory armature, and constitutes a continuation in part of application Serial No. 732,957, filed June 29, 1934.

Electromagnetic motors provided with a vibratory armature have a variety of uses, among which may be included the application of providing an interrupted or pulsating current in electric systems for operating electrical devices. The vibratory armature may also be employed to impart motion intermittently or continuously to mechanical devices and, when the armature is employed with suitable mechanism, a rotary movement can be imparted to a driven element.

One particular application of vibratory electromagnetic motors is their use as power units in toys either to propel them or to produce mechanical movements that simulate movements of actual machines of which the toys are replicas. In many instances small dry cells are employed as the source of electrical energy for these vibratory motors, and this is particularly true when they are used as the motive power in propelling toys. In order to maintain the cost of these toys as low as possible, no special consideration generally has been given to the construction of the vibratory motors employed, with the result that inefficient motors having a relatively high current consumption have been provided. This is objectionable when dry cells of the size ordinarily used in flash-lights are employed on account of space limitations, because the life of these cells with such motors is relatively short. These motors are also objectionable because of their inefficiency and inability to provide motive power which will adequately and effectively insure satisfactory and continuous operation of toys in simulating the movements and motions of actual machines.

The objects of this invention are: to provide an improved vibratory electromagnetic motor which may be employed to operate electrical devices and to impart motion intermittently or continuously to mechanical devices; to provide such a motor may be employed with dry cells as a source of electrical energy; to provide such a motor having a low current consumption whereby the life of dry cells employed to energize the same is prolonged; and to provide mechanism for effectively converting the vibratory movement of the armature of the electromagnetic motor to a rotary movement to drive an element, such as a shaft.

These and other objects and advantages of my invention will become apparent as the following description proceeds, having reference to the accompanying drawings in which Fig. 1 is a view, partly in section, of an electromagnetic motor illustrating one embodiment of this invention, the vibratory armature of which is shown in one position and connected to mechanism for imparting rotary movement to a driven element; Fig. 2 is a view similar to Fig. 1 with the vibratory armature illustrated in another position; Fig. 3 is an end view of the motor and mechanism shown in Figs. 1 and 2; Fig. 4 is a sectional view taken on line 4—4 of Fig. 1; Fig. 5 is a view in elevation of a modification of the electromagnetic motor illustrated in Figs. 1 and 2; Fig. 6 is an end view of the motor shown in Fig. 5; Fig. 7 is a fragmentary sectional view, taken at line 7—7 of Fig. 5, to illustrate parts of the motor more clearly; and Fig. 8 is a fragmentary side view, partly in section, of a modification of the motor shown in Figs. 5 and 6.

Referring to the drawings, the improved vibratory motor which I have illustrated as embodying the principles of this invention includes an electromagnet E comprising a fixed core 10 having a winding 11 arranged thereon about which is snugly fitted a cup-shaped iron shell 12. One end of the core 10 extends into an opening at the substantially flat closed end of the shell 12 which overlies an end of the winding 11, and the other end thereof extends into an opening in an iron end plate 13 which fits into the open end of the shell and abuts the end of the winding 11. It will therefore be seen that the end of the core 10 extending through the opening at the substantially closed end of the shell 12 forms one pole piece of the electromagnet, and that the shell encircling and enclosing the winding 11 and core 10 forms the other pole piece of the electromagnet.

A floating armature A preferably formed entirely of iron is arranged at one end of the electromagnet E. The main body 14 of the armature A is rectangular in shape and relatively large in area, and from one end of the body 14 and at a slight angle thereto is a narrow projection 15. At the end of the armature body 14, adjacent the projection, and on opposite sides thereof are raised portions 16 which are adapted to fit into recesses or opening 17 formed at the end of the shell 12. The raised portions 16 act as the pivot point of the armature A as it is attracted to and retracted from the electromagnet E. It will also be noted that the bend in the armature constitutes, in effect, a fulcrum for said armature, and the portion 15 will act as a stop limiting the upward movement of said armature as it contacts the flat end surface of the shell 12. To retract the armature A from the electromagnet E a helical tension spring 18 is provided having one end thereof secured to the end of the projection 15 of the armature, and the opposite end thereof secured to a projection 19 punched from the side wall of the shell 12.

The armature A carries a leaf spring 20 preferably made of bronze which is fixed thereto at the projection 15, and at the outer end of the leaf spring is secured a contact 21. This movable contact 21 is adapted to cooperate with a fixed contact 22 secured to and insulated from a U-shaped yoke 23 having the arms thereof attached to the end of the shell 12.

The electrical circuit for operating the electromagnetic motor may comprise one or more dry cells indicated at 24, having one terminal grounded at 25 and the opposite terminal connected by a conductor 26 to a terminal 27 of the winding 11. The opposite terminal 28 of the winding 11 may be connected by a conductor 29 to the fixed contact 22. The circuit is completed through the movable contact 21 and leaf spring 20 which may be grounded by a conductor 30 connected to the yoke 23.

In many instances vibratory motors are employed where the space factor is of considerable importance. This is particularly true when such a motor is utilized as the motive power in a toy automobile or a toy motor boat. For this reason the electromagnet E is made sufficiently small having in mind also the important fact that an adequate number of apere-turns should be provided to insure the maximum pull on the armature A. Further, to increase the efficiency of the electromagnet the reluctance of the magnetic path should be at a minimum by providing ample iron for the return path of the magnetic flux. This is effectively accomplished in the electromagnet E by providing the maximum number of turns of the winding 11 and enclosing the same snugly within the iron housing formed by the cup-shaped shell 12 and end plate 13. In this manner an electromagnet of small capacity is provided which is extremely efficient and particularly adaptable to be employed in connection with miniature dry cells because of its relatively low current consumption.

Since the pull of the electromagnet E on the armature A is inversely proportional to the length of the air gap, the air gap is made as small as possible by arranging the armature A to be pivoted at a point close to and at one side of a pole of the electromagnet E. This construction is clearly shown in Fig. 1 wherein the core 10 extends into the opening at the closed end of the shell with the extreme end thereof flush with the outer wall of the shell, while the openings 17 into which the raised portions 16 of the armature fit are disposed on one side of and in the same cross sectional plane as the end of the core. Since there is no air gap between the electromagnet E and the armature A at the pivot point, the concentration of magnetic flux thereat accelerates the movement of the armature toward the electromagnet when the winding 11 is energized.

To prevent chattering and to insure a positive vibratory movement of the armature A, the leaf spring 20 is shaped so that the contacts 21 and 22 are separated and the electromagnetic circuit is interrupted when the body 14 of the armature A is relatively close to the pole face of the electromagnet E. Upon deenergization of the electromagnet the tension spring 18 retracts the armature to close the contacts 21 and 22. To insure a low contact resistance which is comparatively self-cleaning, one of the contacts is preferably formed of tungsten while the other contact is formed of a silver alloy.

The vibratory movement of the armature A may be utilized to drive an element such as the shaft 31. For this purpose the armature may be provided with an extension piece 32 having the extreme end bent to form a lug 33. The lug 33 is adapted to fit into an elongated opening 34 at one end of a plate member 35 having a semi-circular recess with a tooth formed at 36 on the upper edge thereof intermediate its ends. The plate member 35 is pivotally connected at 37 at one end to a frame comprising spaced plates 38 and 39 journaled on a hollow pin 40 having diametrically opposed slots 41 to which the shaft 31 may be splined. A notched wheel or ratchet 42 is fixedly secured to the pin 40 between the plates 38 and 39 and to this ratchet rotary motion can be imparted by the plate member 35 which serves as a pawl.

When the armature A has been retracted from the electromagnet E the pawl and ratchet mechanism is in the position shown in Fig. 2. As the armature A is attracted to the electromagnet E upon closing of the electromagnetic circuit through the contacts 21 and 22, the pawl or plate member 35 and the plates 38 and 39 are moved angularly about the hollow pin 40. With this angular movement the pawl 35 is also moved toward the wheel 42 so that the tooth 36 will engage a notch thereon, and upon further movement of the armature A toward the electromagnet E a rotary movement is imparted to the ratchet wheel 42. When the armature A has been attracted to the electromagnet E, the pawl and mechanism assume the position shown in Fig. 1. Upon retraction of the armature A by the tension spring 18, the pawl or plate member 35 becomes disengaged from the ratchet wheel 42.

When the pawl 35 is arranged in an inverted position with the pawl below the ratchet wheel 42, the pawl remains clear of the wheel due to its own weight. The lowest position the pawl 35 can assume is determined by a stop 43 formed by bending the extreme end of the plate 38 to provide a projection in the path of movement of the pawl. When the ratchet mechanism is arranged so that the pawl 35 is not disposed below the ratchet wheel 42, the mechanism is preferably arranged in such a manner that the projection 44 on the side frame 39 will contact a part of the device on which it is mounted. When the armature 14 is in its retracted position, the pawl 35 will thus disengage the ratchet wheel 42.

It will therefore be seen that when the electromagnet E is deenergized the pawl is disengaged from the notched wheel and the shaft 31 can be freely turned or rotated. This is particularly desirable when such mechanism is employed to propel a toy vehicle, because a child can freely move the vehicle without damaging any of the mechanism when the vibratory motor is not employed to propel the vehicle.

In Figs. 5 to 7 inclusive I have shown a modification of the embodiment illustrated in Figs. 1 to 3 inclusive, with similar letters and numerals to indicate like parts. In Fig. 5 the rectangular-shaped body portion 14' of the floating armature A' is provided with raised portions adjacent a bend in the armature and these raised portions are adapted to fit into recesses or openings formed at the end of the shell 12' which forms one pole piece encircling the pole piece formed by the core 10', as in the previously described embodiment. These raised portions may be produced by punching metal from the opposite side of the armature body, thus producing recesses 45 on the upper side of the armature. The raised portions act as a pivot point of the armature, and to maintain the armature in a fixed position at the end of a shell 12' an armature clamping member 46 is secured, as by brazing or spot welding, to the wall of the shell, the clamping member being provided with inwardly extending arms 47 having bent projections which are adapted to fit into the recesses 45 on the armature A'.

The armature A' is provided with an off-set end 48 to which is secured a leaf spring 20' that carries a contact 21'. The contact 21' is adapted to cooperate with a fixed contact 22' secured to and insulated from a U-shaped yoke 23' having the arms thereof secured to the end of the shell 12'. By providing the off-set end 48 so that the leaf spring 20' is substantially parallel to the body portion 14' of the armature A', a sliding movement is imparted to the contact 21' as it engages and separates from the fixed contact 22', thus preventing pitting of the contacts and prolonging their life.

Whereas the spring 18 in the embodiment illustrated in Figures 1 and 3 acts to retract the armature A from the electromagnet E to maintain the contacts 21 and 22 in a closed position when the electromagnet E is deenergized, the spring 18' in the present embodiment assists the electromagnet E' in attracting the armature A'. When the electromagnet E' is deenergized, therefore, the armature A' is in the position indicated in solid lines in Fig. 5 and the contacts 21' and 22' are separated.

The modified embodiment, therefore, may be termed a non self-starting vibrating motor while the embodiment previously described may be termed a self-starting motor, because in the latter the contacts 21 and 22 are initially in a closed position while in the former the contacts 21' and 22' are initially in an open position.

The modified embodiment may be employed to operate mechanical devices wherein the device intermittently contacts the off-set end 48 of the armature to momentarily close the contacts 21' and 22' to complete the vibratory motor circuit from ground at 25' through the dry cells indicated at 24', the winding of the electromagnet E', conductor 29' contacts 22' and 21', and leaf spring 20' which may be grounded by a conductor 30' connected to the clamp 46.

In Fig. 8 I have illustrated a modification of the vibratory electromagnetic motor illustrated in Figs. 5 to 7 inclusive wherein the contacts 22'' and 21'' are normally maintained in a closed position when the electromagnet E'' is deenergized. Instead of providing recesses at the end of the shell and projections in the armature for pivoting the latter, as in the previously described embodiment, the end of the shell 12'' may be provided with projections 49 and the armature A'' provided with recesses adapted to receive such projections, as shown in Fig. 8.

Although a spring may be employed in the embodiments illustrated in Figs. 5 and 8 to retract the armature from the electromagnet to close the cooperating contacts, as shown in the embodiment illustrated in Fig. 1, it may be desirable to provide a threaded reduced end 50 at the off-set portion 48' which is adapted to receive a small weight 51, the position of which can readily be adjusted to vary the frequency of vibration of the armature A''.

While I have shown particular embodiments of my invention it will be apparent that modifications may be made without departing from the spirit and scope thereof as set forth in the claims.

What is claimed is:

1. In a vibratory motor, the combination of an electromagnet provided with two magnetic pole pieces of which one has a substantially flat surface portion and encircles the other, said flat surface portion being located at one end of the electromagnet, and a vibratory armature having a bend intermediate its ends, the substantially flat surface portion of said outer pole piece and said armature having a cooperating raised portion and a recess adjacent the bend of said armature, such raised portion being adapted to fit into the recess to form a pivot point for said armature on the substantially flat surface portion of said outer pole piece.

2. In a vibratory motor, the combination of an electromagnet provided with two magnetic pole pieces of which one has a substantially flat surface portion and encircles the other, said flat surface portion being located at one end of the electromagnet, a vibratory armature having a bend intermediate its ends, the substantially flat surface portion of said outer pole piece and said armature having a cooperating raised portion and a recess adjacent the bend of said armature, such raised portion being adapted to fit into the recess to form a pivot point for said armature on the substantially flat surface portion of said outer pole piece, and means fixed to the outer of said pole pieces for maintaining said armature in position adjacent the inner of said pole pieces.

3. In a vibratory motor, the combination of an electromagnet provided with an enclosing shell, a U-shaped yoke having the arms thereof attached to an end of said shell, a contact attached to said yoke, an armature adapted to be attracted by said electromagnet and arranged to be pivoted on the end of said shell, a contact secured directly to said armature in operative relation with said first-mentioned contact, and means including a spring for retracting said armature.

4. In a vibratory motor, the combination of an electromagnet having an enclosing shell provided with an opening and at least one recess at one end thereof, said electromagnet including a core extending into the opening and having the end thereof substantially flush with the outer wall of the shell, a U-shaped yoke having the arms thereof attached to the end of the shell, a vibratory armature adapted to be attracted by said electromagnet, said armature having a projection bent at an angle thereto and a raised portion near the bend adapted to fit into the recess, means including a spring having one end thereof secured to the projection and the opposite end thereof secured to the shell for retracting said armature, and cooperative contacts carried by said armature and yoke.

5. In apparatus of the class described, the combination of an electromagnet and a vibratory armature adapted to be attracted thereby, means for retracting said armature when said electromagnet is rendered inoperative, a shaft, and means for connecting said vibratory armature and said shaft to impart a rotary movement to the latter, said connecting means comprising a ratchet wheel secured to said shaft, a supporting member mounted on said shaft, and a pawl adapted to cooperate with said ratchet wheel and having one end pivotally mounted on said supporting member and the opposite end operatively connected to said armature, said pawl normally remaining spaced from said ratchet wheel when said electromagnet is deenergized to permit said shaft to rotate freely.

6. In apparatus of the class described, the combination of an electromagnet and a vibratory armature adapted to be attracted thereby, means for retracting said armature when said electromagnet is rendered inoperative, a shaft, and means for connecting said vibratory armature to said shaft to impart a rotary movement to the latter, said connecting means comprising a ratchet wheel secured to said shaft, a supporting member mounted on said shaft, and a pawl adapted to cooperate with said ratchet wheel and having one end pivotally mounted on said supporting member and the opposite end operatively connected to said armature, said pawl being disposed below said ratchet wheel and spaced therefrom when said electromagnet is deenergized.

7. In apparatus of the class described, the combination of an electromagnet and a vibratory armature adapted to be attracted thereby, means for retracting said armature when said electromagnet is rendered inoperative, a shaft, and means connecting said vibratory armature and said shaft for imparting a rotary movement to the latter, said connecting means including a frame comprising spaced members mounted on said shaft and angularly movable thereon, a ratchet wheel secured to said shaft and disposed between said spaced members, and a pawl adapted to cooperate with said ratchet wheel pivotally connected to said spaced members on one side of said shaft and operatively connected to said armature on the opposite side of said shaft.

8. In a vibratory motor, the combination of an electromagnet provided with two magnetic pole pieces at one end thereof of which one pole piece encircles the other; a vibratory armature pivoted to the outer of said pole pieces and overlying the inner of said pole pieces; a U-shaped yoke having the ends thereof rigidly secured to said outer pole piece and an intermediate portion overlying said armature and spaced therefrom; a contact rigidly secured to said yoke; a contact resiliently secured to said armature in operative relation with said first mentioned contact; one of said contacts being insulated from its supporting structure; means for connecting said contacts in a circuit in series with the winding of said electromagnet; and means for retracting said armature and also maintaining said contacts in engagement when said electromagnet is not energized.

9. In a vibratory motor, the combination of an electromagnet provided with a vibratory armature; a ratchet wheel rotatable around a pivot adjacent said armature; a frame rotatable around said pivot; a pawl having one end in operative engagement with said armature and its other end pivoted to said frame at the opposite side of said pivot and said ratchet wheel from said first mentioned end, and a tooth intermediate said ends adapted to engage the under side of said ratchet wheel; and means integral with said frame for supporting the intermediate portion of said pawl in a position where said tooth is adjacent but out of engagement with said ratchet wheel.

10. In a vibratory motor, the combination of a horizontal pivot; a ratchet wheel rotatable about said pivot; a frame rotatable about said pivot independently of said ratchet wheel; a pawl pivoted to said frame adjacent to one side of said ratchet wheel and provided with a tooth in operative relation with the lower side of said ratchet wheel and a driven end at the side of said ratchet wheel opposite the portion pivoted to said frame; means movable with said frame for supporting said tooth out of engagement with but adjacent said ratchet wheel; and means for moving said pawl to rotate said ratchet wheel comprising an electromagnet having an armature in operative relation with the driven end of said pawl.

11. In a vibratory motor, the combination of an electromagnet provided with a shell forming a part of the magnetic circuit of the motor; a contact mounted on said shell and insulated therefrom; such contact being spaced from an end of said shell; a vibratory armature adapted to be attracted by said electromagnet and arranged to be pivoted at the end of said shell; a leaf spring fixed to said armature; a contact attached to said leaf spring in operative relation with said first-mentioned contact; and a weight, the position of which is adjustable, adapted to be carried at an end of said armature for controlling the frequency of vibration of said armature.

12. In a vibratory motor, the combination of an electromagnet provided with a shell, a fixed contact mounted on said shell and insulated therefrom, such contact being spaced from an end of said shell, a vibratory armature adapted to be attracted by said electromagnet and arranged to be pivoted at the end of said shell, a leaf spring fixed to said armature, a contact attached to said leaf spring in operative relation with said first-mentioned contact, said contacts being closed when said armature is in a retracted position, and resilient means arranged to assist said electromagnet for attracting said armature.

13. In a vibratory motor, the combination of an electromagnet provided with two magnetic pole pieces, one of said pole pieces having an apertured flat portion encircling the end portion of the other pole piece; a vibratory armature pivoted directly on said flat portion for movement when the electromagnet is energized and having substantially no air gap during vibratory movement thereof; a pair of normally open cooperating contacts of which one is carried by said armature and arranged to contact the other when the armature is moved in one direction; and a source of electrical energy in circuit with said contact and said electromagnet and adapted to energize the latter when said contacts are closed; said armature having a projecting end which is adapted to be contacted and moved by an object and thereby close said contacts so as to energize the electromagnet and attract the armature.

14. In a vibratory motor, the combination of an electromagnet provided with two magnetic pole pieces, one of said pole pieces having an apertured flat portion encircling the end portion of the other pole piece; a vibratory armature bent intermediate its ends to form a fulcrum which is adapted to bear upon the flat surface portion at a line closely adjacent the aperture therein; and means for maintaining the vibratory armature in such position on the flat portion of the pole piece.

15. In a vibratory motor, the combination of a core having a winding arranged thereon, a shell disposed about said winding and having an end wall provided with an opening, said core extending toward the opening and having the end thereof substantially flush with the end wall of said shell, and a vibratory armature bent intermediate its ends, the end wall of said shell and said armature having a cooperating raised portion and a recess adjacent the bend of said armature, such raised portion being adapted to fit into the recess to form a pivot point for such armature on the end wall of said shell.

16. In a vibratory motor, the combination of a core having a winding arranged thereon, a shell disposed about said winding and having a substantially flat end wall forming a pole piece, said end wall having an opening, said core extending toward the opening and forming another pole piece spaced from said end wall, and a vibratory armature bent intermediate its ends and mounted directly on said end wall adjacent the bend, said armature having a body portion adapted, when said armature is in an attracted position, to cover the opening in said end wall.

17. In a vibratory motor, the combination of an electromagnet provided with two magnetic pole pieces of which one has a substantially flat surface portion covering a major portion of one end of the electromagnet, said flat surface portion having an opening therein so as to expose the end of the other pole piece; a vibratory armature bent intermediate its ends to form a fulcrum which is adapted to bear on the flat surface portion of the pole piece; and means for maintaining said vibratory armature in substantially a fixed position adjacent the pole piece of said electromagnet.

18. In a vibratory motor, the combination of an electromagnet provided with two magnetic pole pieces of which one has a substantially flat surface portion at one end of the electromagnet, said flat surface portion having an opening therein into which the end of the other pole piece extends; a vibratory armature bent intermediate its ends to form a fulcrum which is adapted to bear on the flat surface portion of the pole piece, said armature having on each side of the fulcrum thereof a portion extending beyond the edges of the electromagnet; means for maintaining said vibratory armature in substantially a fixed position adjacent the pole piece of said electromagnet; and resilient means associated with one of said extended portions and acting to urge it into contact with the flat surface portion.

19. In a vibratory motor, the combination of an electromagnet having a magnetic enclosing shell provided with an opening in an end wall thereof, said end wall covering a major portion of the end of the electromagnet, said electromagnet including a core extending into the opening and having the end thereof substantially flush with the end wall of the shell; and a vibratory armature arranged to be pivoted upon the end wall of the shell and adjacent the core and having substantially no air gap at the pivotal point during its vibratory movement.

20. In a vibratory motor, the combination of an electromagnet provided with two magnetic pole pieces of which one encircles the other and has a flat end wall which covers a major portion of the end of the electromagnet; and a vibratory armature pivoted upon the flat end wall of the outer of said pole pieces and having substantially no air gap at the pivot during its vibratory movement.

21. In apparatus of the class described, the combination of an electromagnet; a core; a rigid armature fulcrumed adjacent to said core for pivotal movement toward and away from said core, and having an offset portion adjacent to the fulcrum; a leaf spring secured at one end to said offset portion and extending substantially parallel with said armature; a fixed contact; a movable contact secured to said spring adjacent to its free end; means for retracting said armature from said core and for flexing said spring to connect said contacts, said offset spring thereby moving longitudinally during pivotal movement of said armature whereby said movable contact wipes said fixed contact to maintain the respective surfaces clean and flat.

RALPH R. SMITH.